United States Patent [19]
Manaka

[11] Patent Number: 5,956,940
[45] Date of Patent: Sep. 28, 1999

[54] METHOD AND APPARATUS FOR MONITORING DETERIORATION OF INTERNAL COMBUSTION ENGINE EXHAUST GAS PURIFIER

[75] Inventor: Toshio Manaka, Katsuta, Japan

[73] Assignee: Hitachi, Ltd., Tokyo, Japan

[21] Appl. No.: 08/513,665

[22] Filed: Aug. 9, 1995

Related U.S. Application Data

[63] Continuation of application No. 08/020,189, Feb. 16, 1993, abandoned, which is a continuation of application No. 07/746,103, Aug. 15, 1991, abandoned.

[30] Foreign Application Priority Data

Aug. 29, 1990 [JP] Japan ................................. 2-225349

[51] Int. Cl.$^6$ ........................................... F01N 3/00
[52] U.S. Cl. .................... 60/274; 60/276; 60/277
[58] Field of Search ................. 60/273, 274, 276, 60/277

[56] References Cited

U.S. PATENT DOCUMENTS

| | | | |
|---|---|---|---|
| 3,969,932 | 7/1976 | Rieger . | |
| 4,228,775 | 10/1980 | Schweikert | 123/696 |
| 4,691,562 | 9/1987 | Abthoff et al. | 73/118.1 |
| 4,993,393 | 2/1991 | Hosoda et al. | 123/695 |
| 5,018,348 | 5/1991 | Dürschmidt et al. | 60/274 |
| 5,077,970 | 1/1992 | Hamburg | 60/274 |
| 5,088,281 | 2/1992 | Izutani et al. | 60/274 |
| 5,157,919 | 10/1992 | Gopp | 60/276 |

OTHER PUBLICATIONS

Patent Abstracts of Japan, vol. 014, No. 181 (M–0961) Apr. 11, 1990 & JP–A–20 33 408 (Toyota Motor Corp).
Patent Abstracts of Japan, vol. 013, No. 032, (P–817) Jan. 25, 1989 & JP–A–63 231 252 (Mitsubishi Motors Corp).

*Primary Examiner*—Thomas E. Denion
*Attorney, Agent, or Firm*—Ladas & Parry

[57] ABSTRACT

A method and apparatus for monitoring deterioration of an internal combustion engine exhaust gas purifier in which first and second sensors are disposed on the upstream and downstream sides respectively of the purifier. The sensors are connected to an electronic control unit which, in normal operation, is arranged to control the air-fuel mixture supplied to each cylinder of the engine by controlling the amount of fuel supplied by an injector so that the air-fuel ratio is a predetermined mean value. The air-fuel ratio is changed from one predetermined value to another predetermined value and delay time taken for the second sensor to change its response subsequent to said change is indicative of the condition of the purifier so that deterioration of the purifier may be readily determined.

6 Claims, 6 Drawing Sheets

METHOD AND APPARATUS FOR MONITORING DETERIORATION OF INTERNAL COMBUSTION ENGINE EXHAUST GAS PURIFIER

This is a continuation of application Ser. No. 08/020,189 filed on Feb. 16, 1993 (now abandoned), which is a continuation of application Ser. No. 07/746,103 filed Aug. 15, 1991 (now abandoned).

BACKGROUND OF THE INVENTION

1. Field of the Invention

This invention relates to a method and apparatus for monitoring deterioration of a catalyst that is disposed inside an exhaust pipe for purifying the exhaust gas.

2. Description of the Related Art

To reduce detrimental components in an exhaust gas, it is known for the exhaust gas to be purified by a ternary catalyst, or the like, disposed inside an exhaust pipe of the internal combustion engine and such a catalyst is now a legal requirement in many States.

Such a catalyst undergoes gradual deterioration in the course of its use. If the catalyst degrades but is left unattended and the automobile is continuously driven, the exhaust gas is no longer naturally purified thereby causing social problems such as air pollution. In order to particularly prevent air pollution, it is a recent trend to also impose a legal obligation to detect deterioration of the catalyst and to give an alarm for deterioration of the catalyst to a driver, as typified by OBD-II, a regulation of the State of California, U.S.A.

Apparatus or methods for monitoring catalyst deterioration are described, for example, in Japanese Patent Laid-Open No. 97852/1988 and Japanese Patent Laid-Open No. 231252/1988. In both prior art documents an $O_2$ sensor is provided at the input and output respectively of a catalyst converter. In operation, the output signal of the input sensor varies between high and low signal levels occasioned by so-called lambda $O_2$ sensor feedback control for fuel injection. In the former prior art publication, the number of changes in signal at the input and output sensors are detected per unit of time and, if the catalyst is in good condition, the number of signal changes per unit of time at the output sensor should be much less than the changes at the input sensor. If the number of changes at the output sensor exceed a predetermined level per unit of time, deterioration of the catalyst is determined. In the latter document, the amplitude of the signal at the input and output sensors should have a predetermined difference (the output sensor amplitude being lower than that of the input sensor) and, if the difference drops below said predetermined level, deterioration of the catalyst is determined.

However, the apparatus and method used in the above prior art involves the problem that a relatively long period of time is necessary for performing the necessary calculation and, hence, delay in detecting catalyst deterioration occurs. Moreover, reliability of this detection result is not sufficiently high.

An object of the present invention is to provide a method and apparatus for determining catalyst deterioration speedily and accurately.

SUMMARY OF THE INVENTION

According to a broad aspect of this invention there is provided a method of monitoring the deterioration of an internal combustion engine exhaust gas purifying means, said purifying means being located within an exhaust pipe of said engine, sensor means disposed downstream of said purification means, said method including the steps of changing the air-fuel ratio from one predetermined value to another predetermined value and measuring the response time of the sensor means whereby said response time is indicative of the condition of said purifying means.

In a feature of said aspect there is provided a method wherein the air-fuel ratio supplied to each cylinder of said engine is measured by a further sensor, the output of said further sensor means being used to control the air-fuel ratio of the air-fuel mixture supplied to each cylinder to a predetermined mean value, changing the air-fuel ratio from one predetermined value to another predetermined value so that the air-fuel ratio detected by the said sensor means is varied.

According to another aspect of this invention there is provided an apparatus for monitoring deterioration of an internal combustion engine exhaust gas purifying means located in an exhaust pipe of said engine including a sensor means disposed downstream of said purifying means, and electronic control means for controlling the air-fuel ratio of said engine, said electronic control means being connected to receive output signals from said sensor means and to measure the time taken for the response of the sensor means to change when the air-fuel ratio is changed from one predetermined value, whereby said time taken for the sensor means response to change is indicative of the condition of said purifying means.

In a feature of said another aspect there is provided a further sensor means provided upstream of said purifying means for detecting the air-fuel mixture supplied to each cylinder of said engine and said electronic control means is adapted to control fuel supplied to each cylinder and in dependence thereon said electronic control means controls the air-fuel mixture supplied to each cylinder to a predetermined mean value.

Thus, response performance of the air-fuel ratio sensor on the down stream side of the catalyst when a predetermined mean air-fuel ratio is changed (which may be during air-fuel ratio feedback control) is a measure of the oxygen ($O_2$) storage capacity of the catalyst. Therefore, when the oxygen storage capacity drops (or in other words, when the catalyst deteriorates), response of the air-fuel ratio sensor downstream of the catalyst becomes faster. Accordingly, the present invention reliably diagnoses conversion efficiency of the catalyst by monitoring the response time of the downstream air-fuel ratio sensor.

BRIEF DESCRIPTION OF THE DRAWINGS

The invention will now be described, by way of example, with reference to the accompanying drawings in which.

In the Figures like reference numerals denote like parts.

DESCRIPTION OF PREFERRED EMBODIMENTS

Figure 1:
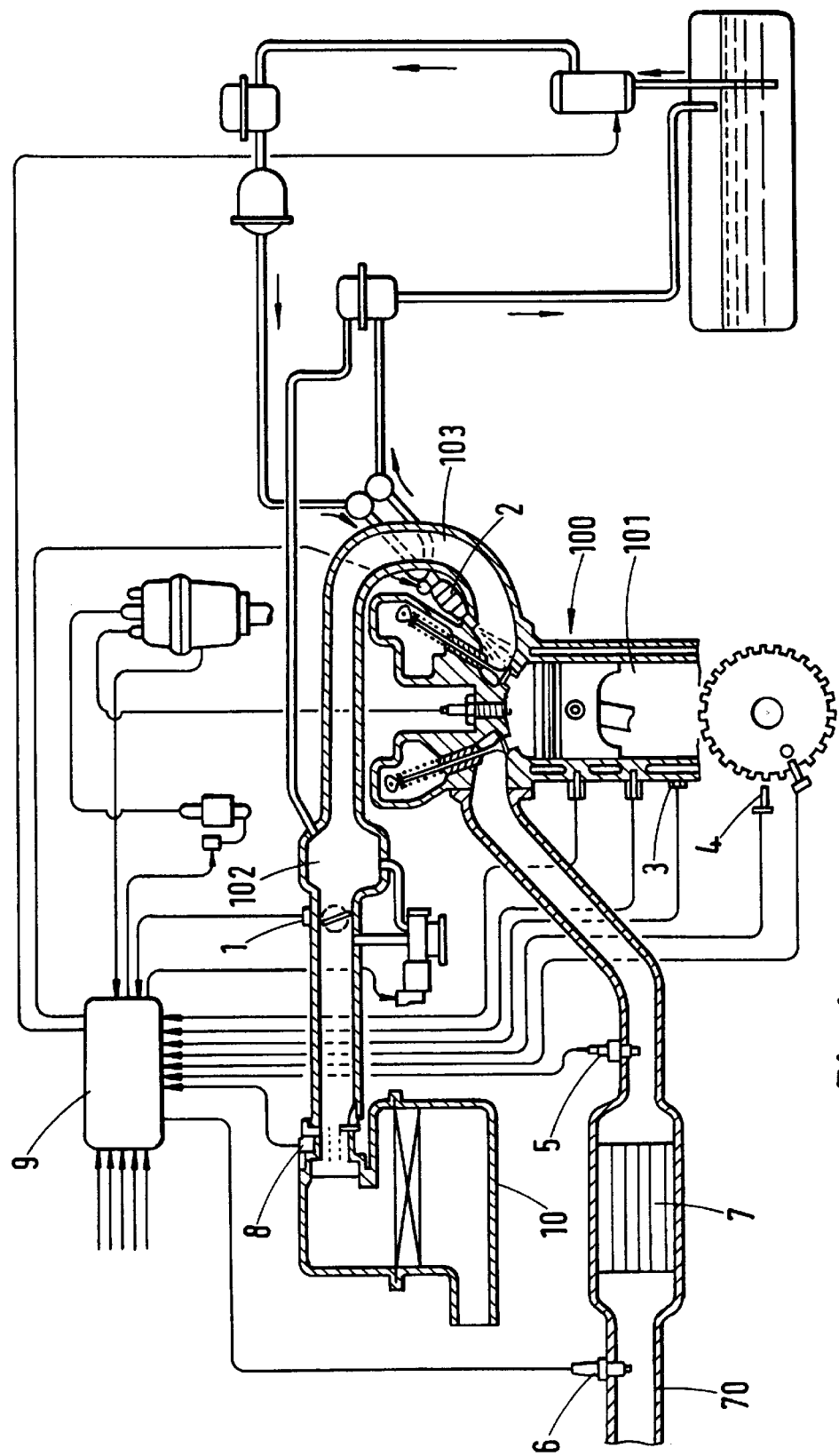
FIG. 1 shows in schematic form and partially cross-sectioned a view of the overall construction of an air-fuel ratio control apparatus in accordance with this invention.

An air-fuel ratio control apparatus of this invention for an internal combustion engine is shown in FIG. 1.

In FIG. 1, air introduced from an air cleaner 10 passes through an air flow sensor 8, for example, a hot wire air flow meter, for metering an intake air quantity, a throttle sensor 1 for detecting the amount of opening (for example, a rotation angle sensor) of a throttle valve, a collect chamber 102 and an intake pipe 103, and is introduced into each cylinder 101 of the internal combustion engine 100. A water temperature sensor 3 is provided for sensing the engine coolent temperature and a rotation sensor 4 is provided for sensing the engine rotation. The rotation sensor may comprise, for example, a rotary disc which is fitted to the crankshaft, the disc having a plurality of teeth around its outer periphery for angular position determination and a magnetic pickup disposed in the proximity of the teeth and the protuberances respectively.

A so-called "catalyst" (for example a ternary catalyst) 7 for purifying exhaust gas is disposed in an exhaust pipe 70 for exhausting the exhaust gas from the cylinders 101, and first and second $O_2$ sensors 5 and 6 are fitted upstream and downstream respectively of the catalyst 7. As is well known, the $O_2$ sensors detect the oxygen concentration in the exhaust gas.

Output signals from the air flow sensor 8 representing the engine intake air quantity Qa, the throttle sensor 1 representing the throttle opening signal $\theta_{TH}$, the water temperature sensor 3 representing the engine cooling water temperature $T_W$, the rotation sensor 4 representing the number of engine revolutions N and the first and second $O_2$ sensors 5, 6 representing the air-fuel ratio signals ahead and behind the catalyst are inputted to an engine control unit 9 consisting of, for example, a microcomputer. The engine control unit 9 calculates a fuel injection pulse signal suitable for the operational condition of the engine determined from the various input signals, which fuel injection pulse signal is outputted to an injector 2 so as to control the fuel quantity supplied to the engine and thereby controlling the air-fuel ratio of the air-fuel mixture.

Figure 2:
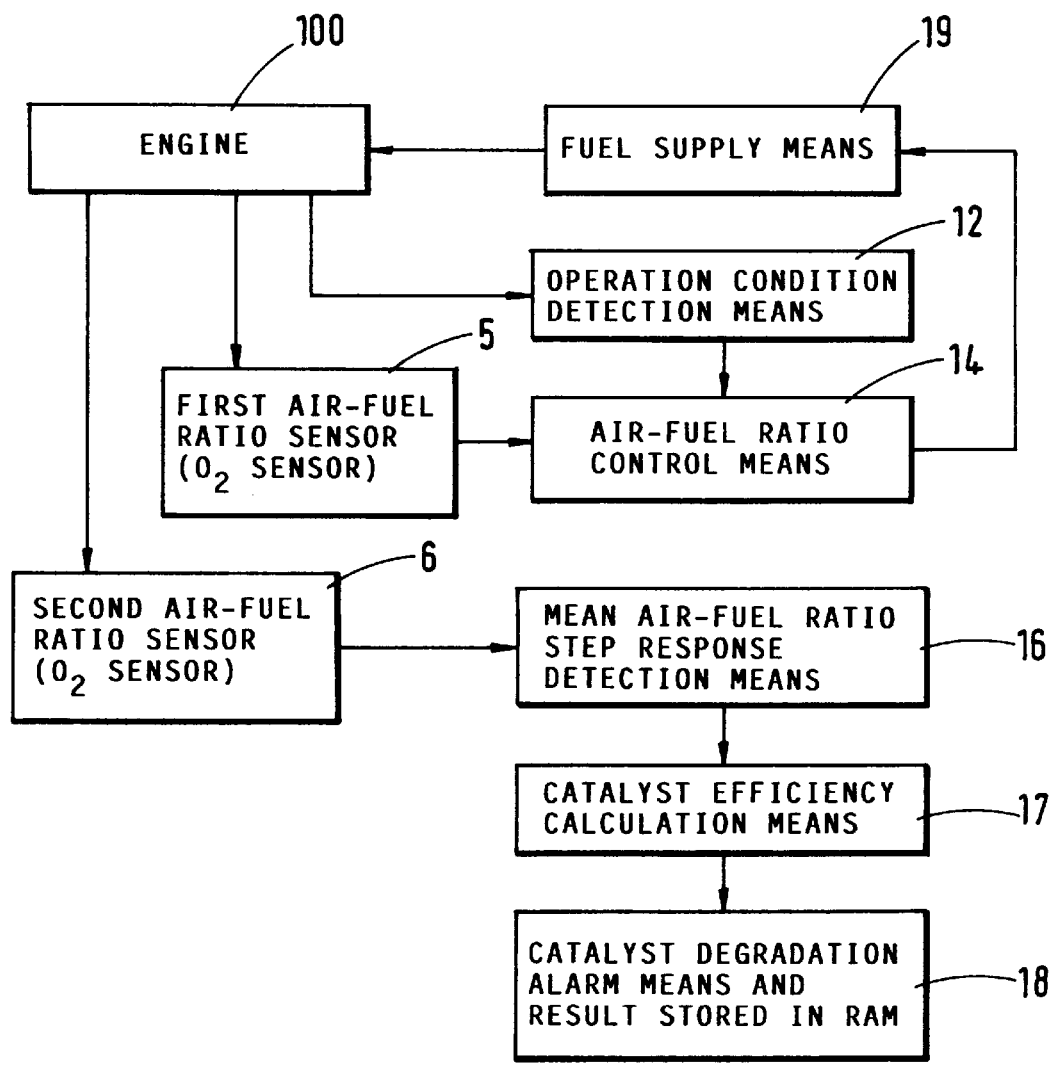
FIG. 2 shows in block schematic form an air-fuel ratio control apparatus of an internal combustion engine in accordance with this invention.

The lambda $\lambda$ control of the supply fuel will now be further explained. First of all, whether the actual air-fuel ratio from the first $O_2$ sensor 5 is richer or leaner than a theoretical air-fuel ratio is detected and the fuel injection quantity is increased or decreased on the basis of this detection value so that the air-fuel ratio is always controlled to the theoretical air-fuel ratio. FIG. 2 shows the block diagram of the air-fuel ratio controller of the present invention. The operational condition of the engine is detected by operational condition detection means and a fuel injection pulse signal $T_i$ corresponding to this detection value is calculated by air-fuel ratio control means 14 and outputted to fuel supply means 19. Since the fuel injection pulse signal $T_i$ is corrected in response to the air-fuel ratio signal of the first $O_2$ sensor 5, the air-fuel ratio supplied in practice to the engine is controlled near to the theoretical (ideal) air-fuel ratio.

On the other hand, the step response signal of a mean air-fuel ratio that is derived by the second $O_2$ sensor 6 downstream of the catalyst 7 (to be described hereinafter with reference to FIG. 3(d)) is measured by step response detection means 16 for the mean air-fuel ratio and catalyst efficiency is calculated by catalyst efficiency calculation means 17 from the output of the step response detection means 16. If calculated catalyst efficiency is lower than a predetermined value, alarm means 18 is activated and at the same time, the result is stored in RAM.

Figure 3A:
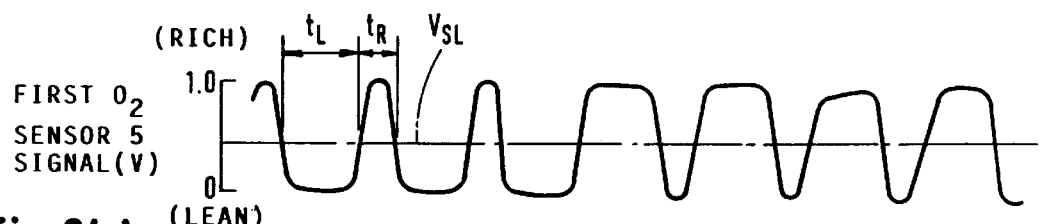
FIGS. 3(a)–(d) show operational waveforms at different portions of the control apparatus.

FIGS. 3(a)–(d) show waveforms at portions of the apparatus which are useful for explaining the operation of the present invention. The output signal of the first $O_2$ sensor 5 is shown in FIG. 3(a) where $t_R$ and $t_L$ denote the time the air-fuel ratio is rich or lean respectively with respect to a judgement level voltage $V_{SL}$.

Figure 3B:
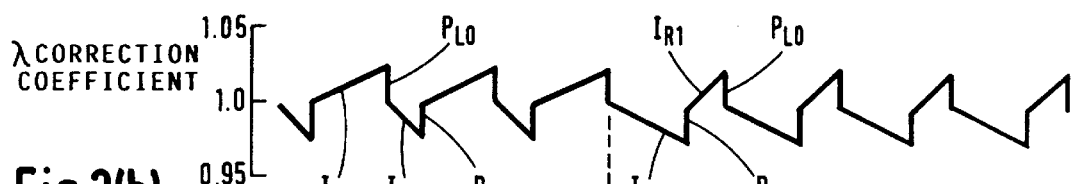
Figure 3C:
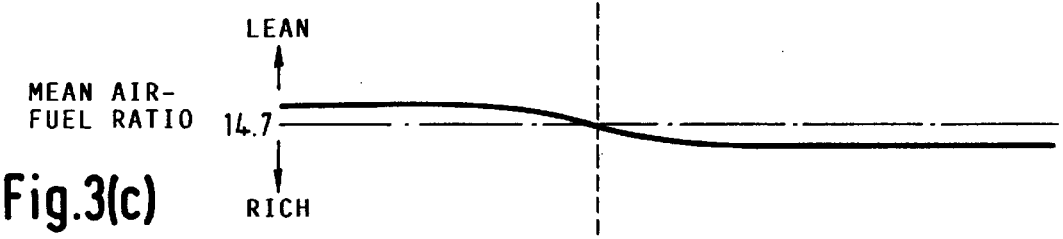

A $\lambda$ correction coefficient $\alpha$ shown in FIG. 3(b) is a coefficient which is multiplied by a basic injection pulse width and when the multiplied coefficient value increases, the injection pulse width becomes elongated, the fuel injection quantity increases and the air-fuel ratio becomes rich. If $\alpha$ decreases, on the contrary, the operation described above is reversed. In the waveform of $\alpha$, the proportion between the lean time $t_L$ and the rich time $t_R$ of the air-fuel ratio can be regulated by appropriately pre-selecting the feedback gain proportional components $P_R$, $P_L$ of the air-fuel ratio control and the integration components $I_R$, $I_L$ in a manner known per se to ensure the average A/F ratio is a predetermined value of 14.7. In this invention at least one of the feedback gain components or the integration components are altered during engine operation so that the mean air-fuel ratio is shifted from a lean state to a rich state, as shown in FIG. 3(c). The alteration of the components is performed at least once between ignition switch ON and switch OFF to effect the monitoring operation of this invention.

Figure 3D:
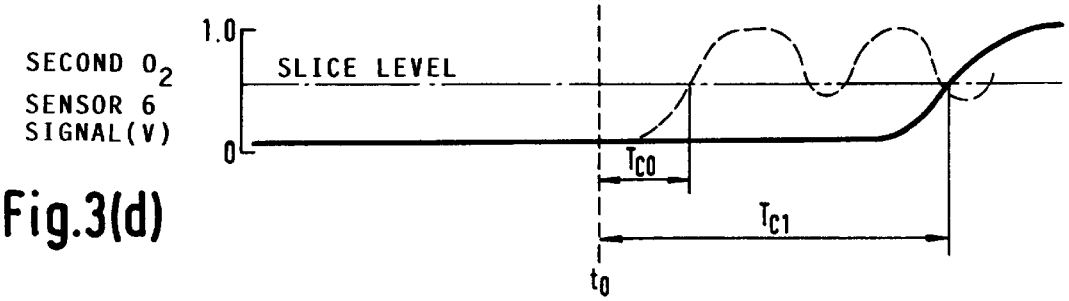
Figure 4:
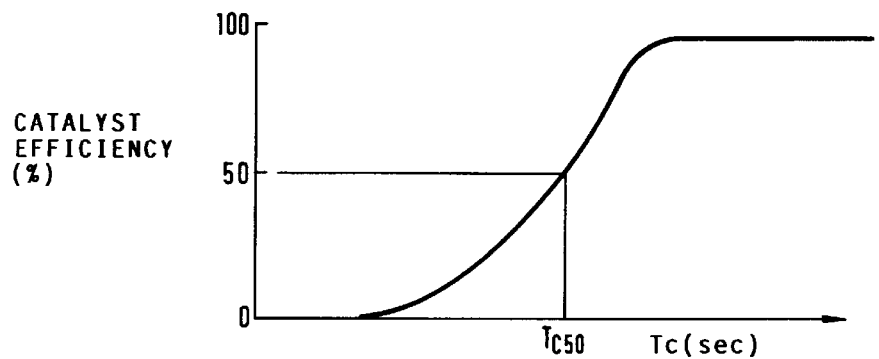
FIG. 4 shows a graph of the relation between efficiency of the catalyst and response delay time (Tc)

The output signal of the second $O_2$ sensor 6 (FIG. 3(d)) is about 0 V if the mean air-fuel ratio (FIG. 3(c)) is leaner than the theoretical air-fuel ratio and is about 1 V if the mean air-fuel ratio is richer than the theoretical air-fuel ratio, due to the respiration of $O_2$ inside the catalyst 7. The delay time Tc (Tco, Tcl) of the output signal of the second $O_2$ sensor 6 after the mean air-fuel ratio changes in a step-wise fashion (preferably from lean to rich (as shown) or, alternatively, from rich to lean) has the relation with catalyst efficiency as shown in FIG. 4 and catalyst efficiency can be determined from the delay time Tc (several seconds to some dozens of seconds) by utilizing this relationship. In other words, the delay time Tco, shown in FIG. 3(d), is of a deteriorated catalyst and the delay Tcl of the output of the second sensor 6 is representative of the condition of an efficient catalyst 7. More particularly, it is possible to predetermine the delay time $Tc_{50}$ when catalyst efficiency is 50%, so that is thereafter possible to make a judgement if the catalyst becomes degraded when the Tc value actually measured is shorter than the time $Tc_{50}$, and to then raise an alarm.

In order to change the mean air-fuel ratio, in the above described embodiment, $I_R$ (the integration component) was changed from a small value to a great value ($I_{RO}$ (small) →$I_{R1}$ (great)) and $I_L$ was changed from a great value to a small value ($I_{LO}$ (great)→$I_{L1}$ (small)) as described in FIG. 3(b) above, but the invention is not intended to be limited to such a means for changing mean air-fuel ratio. For example, it is possible to change the proportional components $P_R$, $P_L$ (see FIG. 5(b)) or to change the judgement level voltage $V_{SL}$ (see FIG. 5(a)).

Figure 6:
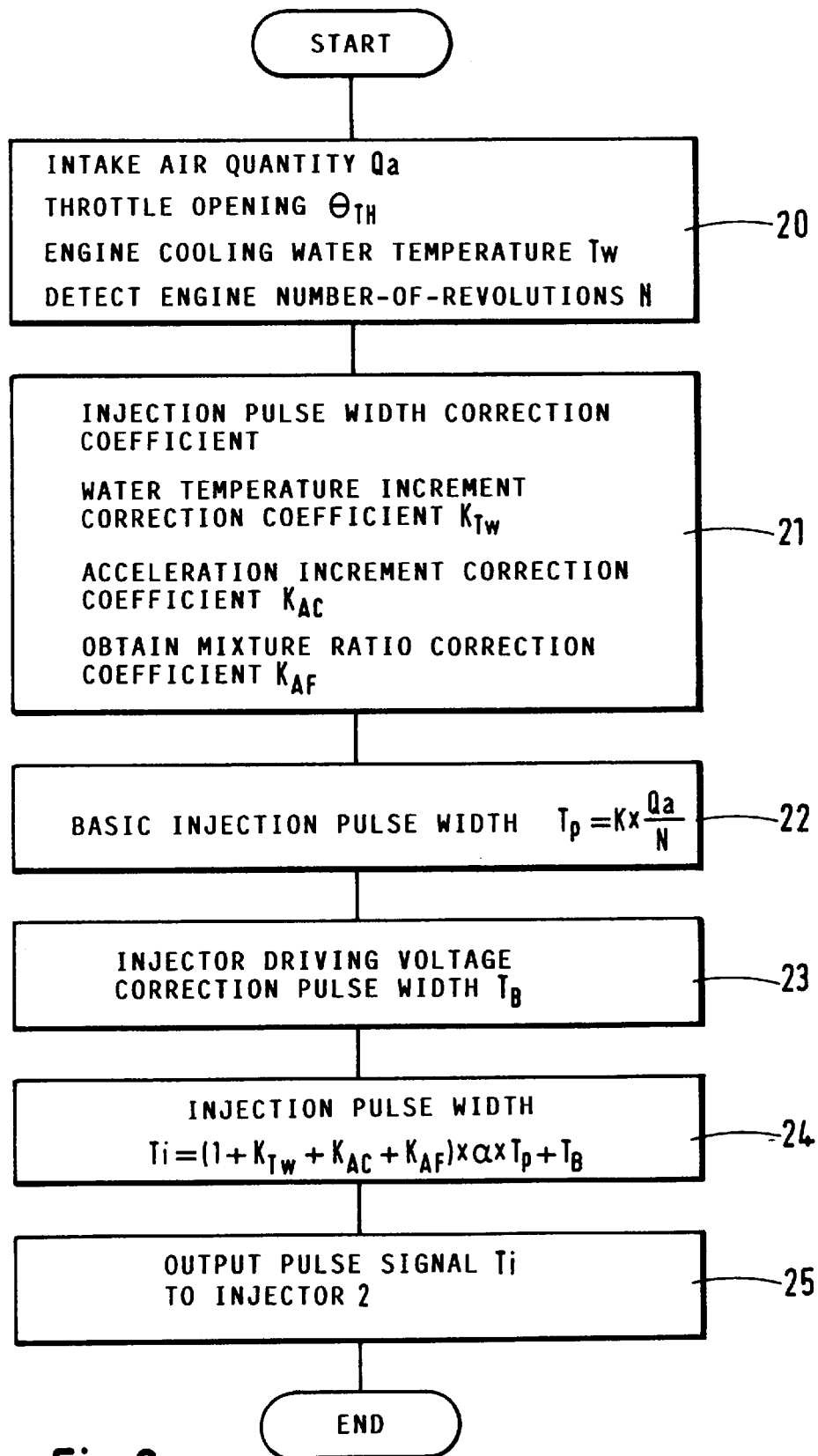
FIGS. 6 and 7 show flowcharts of the operation of the control apparatus of this invention.
Figure 7:
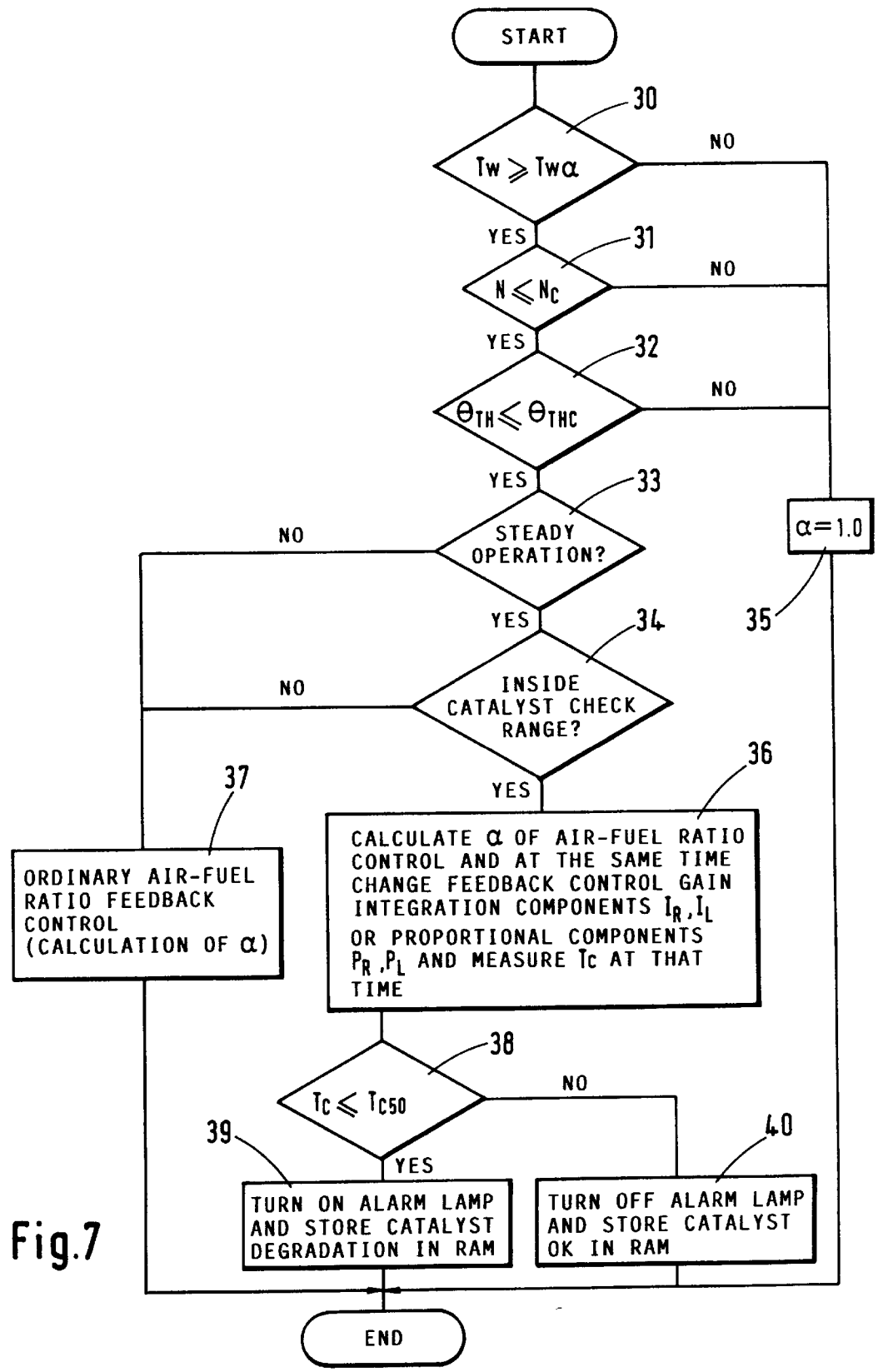

FIGS. 6 and 7 are flowcharts showing an example of the control program for executing the air-fuel ratio control method of the present invention. First of all, parameters N, Qa, $\theta_{TH}$, and Tw representing the operation conditions of the engine are detected at step 20. Injection pulse width correction coefficients KAF, KAC, KTW in accordance with the operational conditions are determined on the basis of the parameters at step 21. Next, the basic fuel injection pulse width Tp is calculated from Qa and N at step 22. Here, K is the constant which is determined by the injection quantity characteristics of the injector. An injector driving voltage correction pulse $T_B$ is calculated at step 23 and an injection pulse width $T_1$ is calculated and outputted for driving the injector 2. The flow is thus completed.

FIG. 7 shows the flowchart for the judgement of catalyst deterioration of the air-fuel ratio control. First of all, whether or not the operation range is within the air-fuel ratio control range is judged by Tw, N and $\theta_{TH}$ at steps 30, 31 and 32 and if the result of judgement proves "NO", the flow shifts to step 35, where α=1.0 is set and the flow is completed.

On the other hand, if the result is judged as "YES" at steps 30, 31 and 32 described above, whether or not the operation is a steady operation is judged at step 33 and if the result of judgement proves "NO", ordinary air-fuel ratio feedback control is effected at step 37. This judgement of the steady operation is made, for example, by checking whether or not Qa, N and $\theta_{TH}$ are constant. If steady state operation is determined, then whether or not the operational range is within a range where the catalyst is monitored is judged at step 34 and if the result is again "NO", the processing of step 37 is effected. The judgement whether the range is within the range where the catalyst should be monitored can be made by judging whether or not N≦Nc and $\theta_{TH} \geq \theta_{THC}$, where Nc and $\theta_{THC}$ are predetermined values. In other words, if the engine is accelerating, for example, it is required that the A/F ratio be rich and catalyst monitoring should not be effected at that time.

Figure 5A:
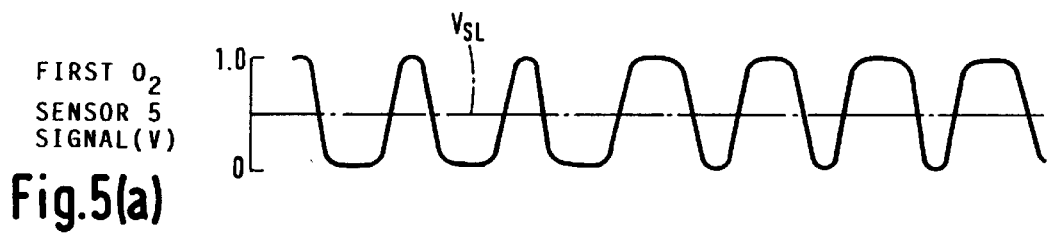
FIGS. 5(a)–(c) show operational waveforms similar to the corresponding FIGS. 3(a)–(c) but in which the means by which the air-fuel ratio is altered is different from that shown in FIGS. 3(a)–(d)
Figure 5B:
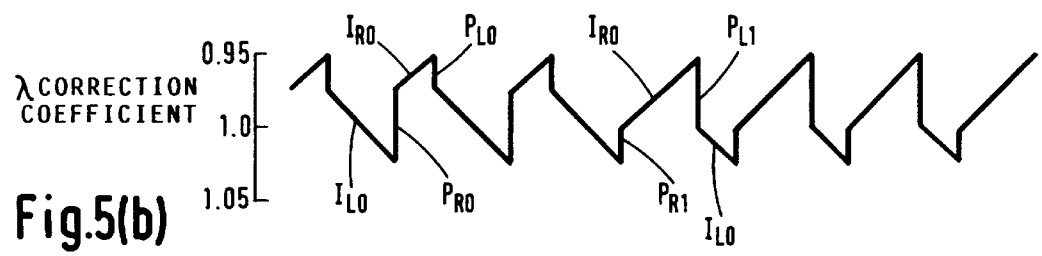
Figure 5C:

If the result of judgement proves "YES" at steps 30, 31, 32, 33 and 34, the flow shifts to step 36, where the feedback control gain is changed as shown in FIG. 3(b) or 5(a), (b) and the response delay time Tc of the second $O_2$ sensor 6 is measured, so that deterioration of the catalyst is judged and the alarm may be raised.

Thus, whether or not Tc is below $Tc_{50}$ is judged at step 38 and if the result is "YES", an alarm lamp is turned ON at step 39 and at the same time, catalyst deterioration is stored in RAM. On the other hand, if the result is "NO", the alarm lamp either remains or is turned OFF at step 40 and the fact that catalyst is in good condition (or is not degraded) is stored in RAM.

As will now be understood from the detailed description of the invention given above, the present invention can judge with high reliability any deterioration of the catalyst within a relatively short period of time and consequently, provides the excellent effect that air pollution due to catalyst deterioration can be restricted.

It is to be understood that the invention has been described with reference to exemplary embodiments, and modifications may be made without departing from the spirit and scope of the invention as defined in the appended claims.

I claim:

1. A method of monitoring the deterioration of an internal combustion having an engine exhaust gas purifying means provided within an exhaust pipe of said engine, including the steps of:
    (a) providing a sensor means downstream of said purifying means;
    (b) providing a further sensor means upstream of said purifying means;
    (c) providing a control means for controlling an actual air-fuel ratio of the air-fuel mixture supplied to each cylinder of said engine to have a required mean air-fuel ratio;
    (d) arranging said engine to have a preferred air-fuel ratio with a value of 14.7 which is an air-fuel ratio midway between a rich condition and a lean condition;
    (e) measuring said mean air-fuel ratio from an output of said downstream sensor means;
    (f) using an output of said upstream sensor means to drive said control means through a closed loop algorithm to change said mean air-fuel ratio from a first amount on one side of said preferred air-fuel ratio to another amount on another side of said preferred air-fuel ratio;
    (g) measuring the time taken from said change for said output of said downstream sensor means to reach a predetermined level, whereby said time is indicative of a deteriorative condition of said purifying means; and
    (h) judging whether the engine is in a steady state operating condition whereby only if such a condition is judged to exist is said upstream sensor means used to drive said control means in step (f).

2. A method as claimed in claim 1 wherein said predetermined average air-fuel value of the air-fuel mixture supplied to each cylinder of said engine is measured by a further sensor means, and an output of said further sensor means is used to control said control means to change said predetermined average air-fuel value from said first amount to said another amount.

3. A method as claimed in claim 1 wherein said predetermined average air-fuel value is changed from said first amount to said another amount in a step-wise fashion.

4. A method as claimed in claim 1 wherein said first amount represents a rich condition of said preferred air-fuel ratio.

5. A method as claimed in claim 1 wherein said step of changing said predetermined average air-fuel value is performed by a step of modifying one of an integration component, a proportional component, and a threshold voltage through a closed loop algorithm.

6. An apparatus for monitoring the deterioration of an internal combustion engine having an exhaust gas purifying means provided within an exhaust pipe of said engine, said apparatus including:
    (a) sensor means disposed downstream of said purifying means;
    (b) further sensor means disposed upstream of said purifying means;
    (c) electronic control means for controlling an actual air-fuel ratio of the air-fuel mixture supplied to each cylinder of said engine to have a required mean air-fuel ratio;
    (d) an output of said downstream sensor means providing a signal indicative of said mean air-fuel ratio;
    (e) determining means for determining said engine to have a preferred air-fuel ratio with a value of 14.7 which is an air-fuel ratio midway between a rich condition and a lean condition;
    (f) measuring means for measuring said mean air-fuel ratio from an output of said downstream sensor means;
    (g) driving means controlled by said signal through a closed loop algorithm to change said mean air-fuel ratio from a first amount on one side of said preferred air-fuel ratio to another amount on another side of said preferred air-fuel ratio;
    (h) further measuring means for measuring the time taken from said change for said output of said downstream sensor means to reach a predetermined level, whereby said time is indicative of a deteriorative condition of said purifying means; and (i) judging means for judging whether the engine is in a steady state operative condition whereby only if such a condition is judged to exist is said driving means controlled by said signal through said closed loop control algorithm to change said mean air-fuel ratio from said first amount to said another amount.

* * * * *